Patented Sept. 14, 1937

2,092,998

UNITED STATES PATENT OFFICE 2,092,998

RESIN POLYMERIZATION

George Kenneth Anderson, Pittsburgh, and William D. Johnston, Jr., Dormont, Pa., assignors to The Neville Company, a corporation of Pennsylvania No Drawing. Application February 17, 1936, Serial No. 64,340

6 Claims. (Cl. 260—7)

This invention relates to the production of synthetic resin by polymerization of polymerizable reactives in crude solvent naphtha and similar non-aliphatic hydrocarbon liquids, which class of polymerizable-containing liquids will be hereinafter referred to throughout the specification and claims as crude solvent naphtha.

The product known in industry as crude solvent naphtha is a fraction boiling between 130° C. and 210° C. Various fractions and composites within this boiling range are commercially available. As produced, they possess widely diverse compositions. Prominent among the unsaturated constituents, contained in the various cuts of crude solvent naphtha, which are capable of forming resins, are styrene, dicyclopentadiene, coumarone, and indene. Not only does the reactive content of these fractions vary in composition, but in commercially produced examples the cuts vary also in concentration of the total polymerizables. Examples of such variations are given in the following table:

| Boiling range °C. | Percent weight reactives |
|---|---|
| 170–195 | 60–70 |
| 165–190 | 85 |
| 160–180 | 7–10 |
| 135–158 | 12 |
| 135–185 | 30 |
| 160–185 | 50 |

Resins produced by polymerization of the various polymerizable reactives mentioned resemble each other closely in their fundamental characteristics and may all be considered for the purposes hereof to be embraced by the commonly used term "coumarone" resin.

It is, in general, true that the lower the polymerizable content of the crude, the more vigorous must be the means employed to polymerize the resin-forming constituents if a resin and a refined solvent are to be produced. It sometimes happens when treating a lean crude, especially when using sulphuric acid as a catalyst, that the vigor of the treatment required is detrimental to the quality of the resin, and may even result in destruction of a portion of the inert naphthas by unduly emphasizing the oxidizing and sulphonating capabilities of the acid. Our method is particularly well adapted to preparation of useful resins from such lean crudes.

Again, and notably in the case of crudes whose polymerizable content consists largely of dicyclopentadiene, a catalyst with marked oxidizing tendencies such as sulphuric acid will tend toward destruction of the polymerizable constituents. Our method is particularly well adapted to the preparation of useful resins from such crudes.

Again, and notably in the case of crudes whose polymerizable content consists largely of styrene, the use of a sulphuric acid catalyst tends toward a formation of oils rather than resins. By our method, a useful solid resin is produced from such fractions.

Again, and notably in the case of crudes whose polymerizable content consists largely of coumarone and indene in high concentration, when sulphuric acid is used as a catalyst, highly specialized means of controlling the reaction, such as costly refrigeration and dilution conditions, are necessary to promote control of the polymerizing reaction and to prevent temperature surge. Our method is particularly well adapted to the preparation of useful resins from such crudes.

Thus, our method is adaptable to the preparation of useful resins from a wide variety of crude solvent naphthas.

In accordance with our invention herein disclosed, we conduct polymerization by means of a specialized catalyst capable of promoting polymerization in such a moderate and progressive manner as to render its use desirable in a resin-forming polymerization conducted upon coumarone and indene reactives, and which is of particular importance in promoting polymerization of polymerizables that are more reactive than coumarone and indene, such as dicyclopentadiene and styrene reactives mentioned above.

In effecting a resin-forming polymerization in accordance with our method, whether the primary purpose be the recovery of resin from the crude solvent naphtha or the refining of a crude solvent naphtha by conducting a resin-forming polymerization therein, we use activated clay as a catalyst, or agent, promoting polymerization. By activated clay we mean a clay which has been acid treated, as by sulphuric acid, in order to increase the porosity, or surface area, of its particles. Because of the increase of surface area of the clay particles by increase of particle porosity, the adsorptive qualities of the clay are greatly increased. The activated clay which we use is of a sort from which all, or substantially all, of the treating acid has been removed, as by washing, or neutralization and washing. Such activated clay we have found to be, under appropriate conditions, an adequate polymerization-promoting agent.

In conducting polymerization in accordance with our method, the general steps involved are: addition of the clay in an amount which desirably approximates 5% of the weight of the crude solvent naphtha, application of heat to the resulting suspension, the filtration of the clay from the reaction mixture, and distillation of the filtered oil to separate the resin from the oils in the usual manner.

While we do not wish to be thereby limited in our invention, the following typical examples may be considered as falling within the scope of our method:

Example 1.—By weight, 897 parts of a mixed crude solvent naphtha, boiling range 135° C.–185° C., were mixed with 50 parts of activated clay at room temperature. Using mechanical agitation, the mixture was rapidly heated by radiation from an electric heating element to 90° C. and the temperature maintained at 90° C.–100° C. for one-half hour. The mixture was then filtered hot. From the filtrate there was recovered 211 parts of a moderately hard, amber-colored resin (definite precipitation from Stoddard naphtha at below —5° C.)

Example 2.—430 parts of a light crude solvent naphtha, boiling range 135° C.–159° C., were mixed with 25 parts of activated clay. The mixture was heated to 80° C. and the temperature maintained at 80° C.–100° C. for one hour. The clay was then filtered out, and from the filtrate 18 parts of a soft pale amber-colored resin were recovered.

Example 3.—By weight, 25 parts of activated clay was suspended in 71 parts of a crude solvent naphtha, boiling range 170° C.–190° C., using vigorous mechanical agitation.

402 parts of this same crude solvent fraction were charged into the polymerizing vessel and heated to 140° C. Using mechanical stirring in the polymerizing vessel, the application of external heat was discontinued and the previously prepared suspension, of clay and crude solvent naphtha, was added continuously in such a manner that the temperature of the reaction mixture was maintained between 138° C. and 154° C. Thus control was effected by maintaining a balance between the cooling by external radiation from the polymerizing vessel and heating by exothermic internal heat of the polymerizing reaction. When the addition was complete, the external heat was reapplied to maintain the temperature of the reaction mixture at 135° C.–155° C. for two hours. The mixture was then filtered. From the filtrate there was recovered 262 parts of a moderately hard, amber-colored resin (definite precipitation from Stoddard naphtha at 0° C.).

Example 4.—72 parts of a crude solvent naphtha, boiling range 160° C.–195° C., having suspended therein 24 parts of activated clay, were added by increments to 408 parts of the same naphtha, treating in accordance with the procedure of Example 3. From the filtrate there was recovered 268 parts of a very hard, brownish-red, clear resin. It will be noted that the crude used in this example had a high concentration of polymerizables consisting almost entirely of dicyclopentadiene.

Returning to a discussion of activated clay used as a polymerization agent, this clay should be of very small particle size. We have obtained best results by using clay passed through a screen having 200 meshes to an inch and upward. It may be stated as a general proposition that the finer the particle size of the activated clay the more effective will be its polymerization-promoting properties. In all the examples given the clay carries a substantial quantity of water, which renders the clay relatively feeble as a catalyst until it is driven off by vaporization. It is, however, possible to use activated clay which is dehydrated in advance.

Regarding Examples 3 and 4, the gradual addition of the clay in an initial, relatively ineffective condition tends to minimize temperature surge and intense local reaction. It should be explained that the clay, while catalytically feeble as it is initially commingled with a portion of the crude solvent naphtha to provide a catalytic suspension, becomes catalytically effective as the water is driven off by temperature conditions in the polymerizing vessel.

It should be noted that, in each of the examples given above, the temperature conditions are such that polymerization would not adequately be effected by heat alone. Thus, while the temperature involved in effecting polymerization in the crude solvent naphtha cuts of Examples 3 and 4 (cuts in which the predominant polymerizables are respectively coumarone-indene and dicyclopentadiene) are higher than those employed in effecting polymerization in the lower boiling cuts containing styrene and like bodies, the temperature in each instance is below that point at which heat in itself would serve to effect even approximately complete polymerization in the crude solvent naphtha.

The use of indirect, rather than direct, heating to provide appropriate temperature conditions in the reactive liquid is of advantage in avoiding the occurrence of intense local reaction due to proximity of a portion of the clay to a highly heated wall region of the polymerizing vessel. It will further be noted particularly that the catalyst may be removed by simple filtration; and that filtration of the clay from the resin solution leaves the solution in such condition that it need not be subjected to the steps of neutralization and washing, which are requisite if sulphuric acid be used as a polymerization-promoting catalyst.

Again referring specifically to Examples 3 and 4, it will also be noted that crudes having a high content of reactives are used. The clay desirably in such instances is added in the specified manner, as a suspension, in order that the clay, dehydration of which occurs instantly on contact with the main body of heated crude, may become catalytically effective at a controlled rate. Such a step eliminates necessity for dilution of the crude with inert naphtha in order to prevent temperature surge. The economic advantage of this step is obvious.

Because our method avoids relatively laborious and costly steps, and because it involves no least degree of sulphonation in the solvent naphtha, reactives of which are removed by polymerization, our method has peculiar commercial importance as practiced upon crude solvent naphthas containing but a small percentage of polymerizable reactives. It may be used upon these lean crudes to effect resin recovery therefrom in a manner which may be considered incidental to the refining of the naphtha, but which renders it practicable to recover from the naphtha such commercially valuable resin as may be represented by the initial polymerizable content of the crude.

Throughout the foregoing specification we have referred only to the formation of resin from the "polymerizable" reactives of crude solvent naphtha to form a "coumarone" resin. The resin herein contemplated by us is thus of characteristically coumarone type produced by straight polymerization, without such involvement of substances other than the polymerizables typically found in crude solvent naphtha as to cause definite deviation in the qualities of the resin from those typical of a coumarone resin, which characteristic qualities may be stated as resistance to acids, alkalies, and alcohols, and ready solubility in the aromatic hydrocarbon solvents.

We claim as our invention:

1. In a process for producing resin of characteristically coumarone type by polymerization of the polymerizable reactives more reactive than coumarone and indene contained in crude solvent naptha, the herein described polymerization step which comprises polymerization of the reactives solely by subjecting the crude solvent naphtha to the catalytic effect of approximately neutral activated clay at elevated temperatures below a temperature at which heat alone acts adequately to effect resin-forming polymerization.

2. In a process for producing resin of characteristically coumarone type by polymerization of the polymerizable reactives contained in crude solvent naphtha having a low concentration of polymerizable reactives, the herein described polymerization step which comprises effecting polymerization of the reactives solely by subjecting the crude solvent naphtha to the catalytic effect of approximately neutral activated clay at elevated temperatures below a temperature at which heat alone acts adequately to effect resin-forming polymerization.

3. In a process for producing resin of characteristically coumarone type by polymerization of the polymerizable reactives contained in crude solvent naphtha, the herein described polymerization step which comprises effecting polymerization of the reactives solely by the catalytic effect of approximately neutral activated clay commingled with the crude solvent naphtha under temperature conditions adequate to dehydrate the clay and below a temperature at which heat alone acts adequately to effect resin-forming polymerization.

4. In a process for producing resins of characteristically coumarone type by polymerization of the polymerizable reactives more reactive than coumarone and indene and contained in crude solvent naphtha, the herein described polymerization step which comprises effecting polymerization of the reactives solely by the catalytic effect of approximately neutral activated clay commingled with the crude solvent naphtha under temperature conditions adequate to dehydrate the clay and below a temperature at which heat alone acts adequately to effect resin-forming polymerization.

5. In a process for producing resin of characteristically coumarone type by polymerization of the polymerizable reactives contained in crude solvent naphtha containing a low concentration of polymerizable reactives, the herein described polymerization step which comprises effecting polymerization of the reactives solely by the catalytic effect of approximately neutral activated clay commingled with the crude solvent naphtha under temperature conditions adequate to dehydrate the clay and below a temperature at which heat alone acts adequately to effect resin-forming polymerization.

6. In a process for producing resin of characteristically coumarone type by polymerization of the polymerizable reactives contained in crude solvent naphtha, the herein described polymerization step which comprises effecting polymerization of the reactives solely by subjecting the crude solvent naphtha to the catalytic effect of approximately neutral activated clay at elevated temperatures below a temperature at which heat alone acts adequately to effect resin-forming polymerization.

GEORGE KENNETH ANDERSON.
WILLIAM D. JOHNSTON, Jr.